July 29, 1941.    S. P. LOVELL    2,251,252
AIR FILTER MATERIAL FOR VACUUM CLEANERS AND THE LIKE
Filed Sept. 11, 1940
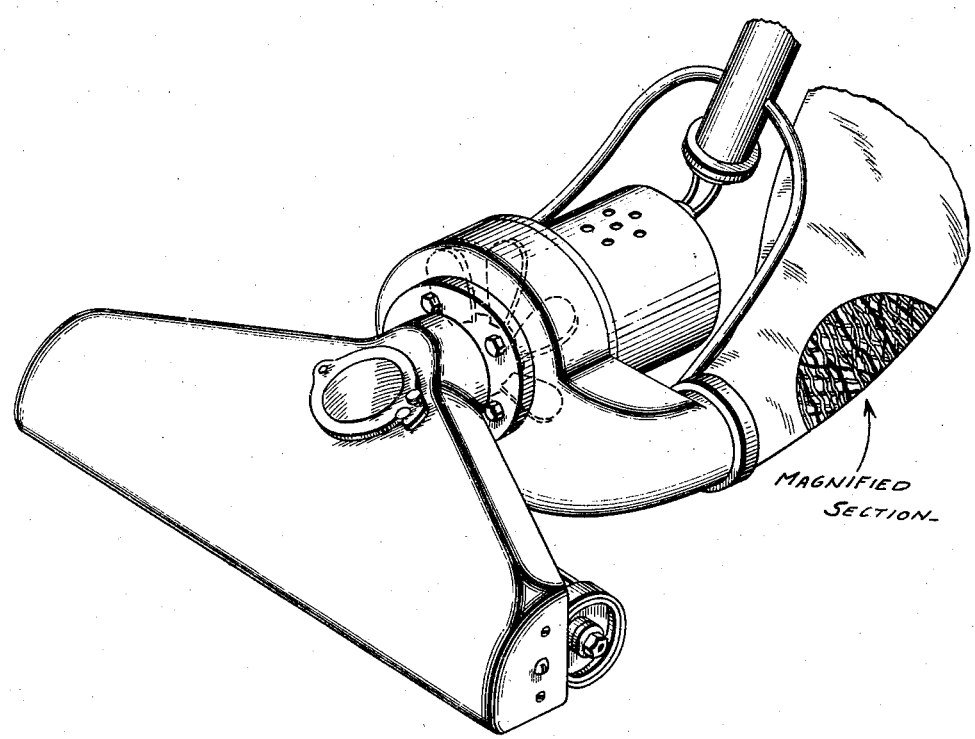
MAGNIFIED SECTION
INVENTOR
Stanley P. Lovell.
by Kenway & Witter. Attys.

Patented July 29, 1941

2,251,252

UNITED STATES PATENT OFFICE 2,251,252

AIR FILTER MATERIAL FOR VACUUM CLEANERS AND THE LIKE

Stanley P. Lovell, Newtonville, Mass., assignor to Beckwith Manufacturing Company, Dover, N. H., a corporation of New Hampshire Application September 11, 1940, Serial No. 356,341

7 Claims. (Cl. 183—51)

This invention consists in a new and improved material for air filtration systems, particularly useful where it is desired to separate a heavy air-borne burden of dust from the air stream as, for example, in a vacuum cleaner.

In the manufacture of air filters it has been a problem for a long time to find an inexpensive filtration material having the optimum characteristics of maximum dust separation with minimum air resistance. Treated fabrics, porous papers and the like have been employed without arriving at a satisfactory solution of the problem. In a vacuum cleaner, for example, a reservoir or dust bag of treated fabric cannot be satisfactorily cleaned after one or two fillings, and where a paper bag is used as a lining the dust is invariably found to deposit between the inner and outer containers. Moreover the air channels in filter bags used heretofore soon become permanently occluded, the efficiency of filtration medium is progressively destroyed and the whole system seriously impaired.

I have discovered a novel filter fabric that is capable of use as an air filter with an efficiency heretofore not practicably obtainable and this fabric is so inexpensive that it may be discarded and replaced by fresh material after an interval of service. It includes in its structure cotton, wool, jute or other non-thermo-reactive fibres in combination with soluble thermo-reactive fibres such as cellulose acetate, to which dust particles tend to adhere. This novel filter fabric has a characteristic of felt in that it is without woven texture. It is, however, united into a bonded web by the amalgamation of the thermo-responsive fibres to each other and to contiguous non-thermo-responsive fibres.

As an important though optional feature of my invention I propose to incorporate in my novel filter material a sizing of a hygroscopic and even deliquescent material. The function of an air filtration medium is greatly enhanced when its fibres are dampened or wetted and since the bonding fibres of my novel material are not water softenable, the strength of the material is not in any way impaired by the addition of moisture through the presence of a hygroscopic sizing.

One process of making the filter material of my invention, and the best process now known to me, is as follows: I comb together on a standard carding machine a mixture of thermo-reactive fibres and non-thermo-reactive fibres until a uniform bat or web is obtained, and by that I mean that the two types of fibres are intermixed with a substantial uniformity of ratio in the bat or web. I prefer to use as my thermo-reactive fibre either cellulose acetate fibre or fibres made from the conjoint polymer of vinyl chloride and vinyl acetate or polymerized vinyl acetate alone. These colloidal and synthetic resinous fibres are readily obtainable in the market as "Tenite" and "Vinyon" fibres. For the non-thermo-reactive ingredient of the material I prefer to employ cotton fibre such as is available as linters, napper flock and the like. The thermo-reactive fibres may constitute from 10% to 35% of the mixture and the non-thermo-responsive fibres from 90% to 65%. By varying the proportions a reasonably controlled density and porosity may be achieved in the finished product.

The thoroughly mixed and combed bat is now subjected to heat and pressure. I prefer to heat the bat in a chamber to approximately 200° F. and then pass the hot bat between calendar pressure rolls although, if more convenient, the bat may be treated intermittently between heated platens in a press. The pressure to which the bat is subjected may be satisfactorily varied within wide limits, 50 lbs. per sq. in. being adequate for easily bonded thermoplastic fibres and 200 lbs. per sq. in. being required where the bonding is more difficult. In any event the treatment must be adequate to produce an amalgamation of the thermo-responsive fibres into a bonded web. A simple test of the adequacy of the bonding step of the process is to subject the fabric to a standard tensile testing machine. Whereas the untreated bat has substantially no tensile strength, the properly heated and pressed fabric will compare favorably in tensile strength with standard hardened and fulled felts.

The thickness of the finished pressed fabric may be varied by the amount or bulk of the fibre combed into the bat. The pressure acquired for the satisfactory bonding operation varies more or less in accordance with the thickness of the fabric. As a general thing the thinner the fabric the lighter the pressure required.

In the filter material of my invention the great majority of the fibres lie wholly in the plane of the web or at right angles to the air stream to be filtered. As distinguished from this in filters formerly employed the fibre direction has been largely parallel to the flow of air current. In the case of woven fabric a nap or pile is generally present being erected substantially at right angles to the lay or direction of the base fabric. Where a felt has been used the fibres come from the fulling operation with a large proportion of them as ends. At the surface of the felt, shearing and buffing accentuate this directional result so that felts as generally used theretofore have had their fibres laid in a high degree at right angles to the plane of the fabric. In the novel pressed fabric of my invention the fibres are subjected only to combing and pressing both of which operations tend to lay the fibre wholly in the plane of the web or sheet but at cross angles to each other. This characteristic allows accurate filtration and better control of the air passages in the material.

The bonding heat-responsive fibres of my novel material, although soluble in organic solvents without change of chemical composition, are not water softenable and thus it is entirely practicable to impregnate the fabric with a water sizing. For example, a standard starch sizing made by heating corn starch in water above the bursting point of the starch may be used. Alternatively I may add an aqueous solution of deliquescent material to the filter fabric, for example, a mixture of calcium chloride, glycerin, glucose or the like. While any salt or compound that retains moisture may be used, I prefer to use a solution of ferric-chloride, approximately four ounces per gallon of water. The fabric when immersed in this solution, wrung out and dried will be found to retain in its non-heat responsive fibres a satisfactory and permanent dampness, yet the heat responsive fibres have not been softened by the solution and in fact are not even wetted nor is their bond with other fabrics in any way impaired.

It will be noted that in the production of the fabric of my invention certain expensive steps heretofore necessary in the production of felt or textile filter material heretofore known are entirely obviated. For example, no weaving, napping, hardening, or fulling operations are required. Accordingly the material of my invention is produced so inexpensively that it may be with good economy discarded after service sufficiently long to reduce the size of the air passages therein.

The most important field of use for the filter material of my invention is in the construction of the dust collecting filter bags for vacuum cleaners. In actual practice as a vacuum cleaner is operated the action of the blower or fan raises the temperature of the air passing through the filter. Experiments indicate that, within a reasonable working range this increase in temperature is approximately 2° F. for each pound of air pressure. This increase in temperature is, of course, relative to the temperature of the incoming air so that in extreme hot weather it becomes an important factor in the engineering of air filtration. When used in such a system this rise in temperature has the effect upon the filtration fabric of my invention of further plasticising and expanding the heat responsive bonding fibres thus automatically allowing the expansion of the filtration barrier and improving the efficiency of filtration by providing new and larger outlet openings in the fabric and by rendering these fibres slightly tacky. A filter employing the material of my invention thus works in direct relationship with the pressure involved since pressure and heat are inseparable in this connection.

In the accompanying drawing I have shown a view in perspective of a vacuum cleaner having a bag of my novel filtration fabric, a somewhat diagrammatic microscopic section of the fabric being added. In this the thermo-reactive fibres, which may be "Tenite," are shown in full black lines and the non-thermo-reactive fibres are shown in double lines. In the example illustrated the ratio of "Tenite" to cotton fibres is approximately 1:3.

As already noted a bag of this fabric contains a substantial proportion of fibres to which dust particles naturally adhere and these fibres constitute a bonded structure in the body of the fabric giving it adequate tensile strength. Accordingly, the fabric may have relatively large filter passages and still exhibit high filtering efficiency, while the cost of the fabric is so moderate that it may be frequently replaced in use.

While I have discused my invention in its application to air filtration systems in general and particularly those wherein heated air streams are to be dealt with, it obviously has broader uses and may be employed with advantage in gas masks or respirators for any purpose.

Having thus disclosed my invention and described an illustrative embodiment thereof, I claim as new and desire to secure by Letters Patent:

1. In a vacuum cleaner, a porous dust-collecting bag of thin felted material including in its structure 10% to 35% of fibres responsive to heat and rendered tacky thereby, and 90% to 65% of commercial felt-making fibres not responsive to heat.

2. In a vacuum cleaner, a porous dust-collecting bag of fibrous material including in its structure 10% to 35% cellulose acetate fibre responsive to heat and rendered tacky thereby, and 90% to 65% cotton fibre.

3. In an air filtering system, a porous filter sheet of felted material including in its structure cotton fibres and synthetic resinous fibres, said resinous fibres being responsive to heat and rendered tacky thereby.

4. In an air filtering system, a porous filter sheet of fibrous material including in its structure a mixture of colloidal heat-reactive fibres and non-heat reactive fibres of cotton, the heat reactive fibres naturally attaching dust particles by adherence and uniting with each other and with the cotton fibres to form a bonded web of appreciable tensile strength.

5. In an air filtering system, a porous filter sheet of felted material including in its structure a mixture of non-thermo-reactive fibres and thermo-reactive fibres united in a bonded web and impregnated with a hygroscopic sizing by which the sheet is maintained in a dampened condition in use.

6. In an air filtering system, a porous filter sheet of fibrous material including in its structure a mixture of cellulose acetate fibres and cotton fibres united in a bonded web and impregnated with a sizing containing ferric chloride.

7. In a vacuum cleaner, a porous dust-collecting bag of felted material including in its structure 10% to 35% of thermo-reactive fibres united into a bonded web, and intermixed with 90% to 65% of commercial felt-making fibres not responsive to heat, the said thermo-reactive fibres being expansible when heated and tending to provide enlarged filtration outlets in the fabric.

STANLEY P. LOVELL.